(12) United States Patent
Okumura (10) Patent No.: US 12,360,522 B2
(45) Date of Patent: Jul. 15, 2025

(54) ELECTRONIC CONTROL DEVICE

(71) Applicant: DENSO CORPORATION, Kariya (JP)

(72) Inventor: Kei Okumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 449 days.

(21) Appl. No.: 18/053,784

(22) Filed: Nov. 9, 2022

(65) Prior Publication Data

US 2023/0185295 A1 Jun. 15, 2023

(30) Foreign Application Priority Data

Dec. 15, 2021 (JP) ................................. 2021-203611

(51) Int. Cl.
*G05B 23/02* (2006.01)
(52) U.S. Cl.
CPC ...... *G05B 23/0256* (2013.01); *G05B 2223/06* (2018.08)
(58) Field of Classification Search
CPC ........................ G05B 23/0256; G05B 2223/06
USPC .................................................. 717/124–135
See application file for complete search history.

(56) References Cited

U.S. PATENT DOCUMENTS

| | | | | |
|---|---|---|---|---|
| 6,341,239 | B1 * | 1/2002 | Hayashi | G05B 19/0426 700/79 |
| 6,490,663 | B1 * | 12/2002 | Komori | G06F 9/4401 713/1 |
| 7,441,235 | B2 * | 10/2008 | Tohdo | G06F 11/3692 714/E11.167 |
| 7,681,183 | B2 * | 3/2010 | Yamamoto | G06F 11/3672 717/134 |
| 9,772,919 | B2 * | 9/2017 | Rajagopal | G06F 11/2733 |
| 10,331,548 | B2 * | 6/2019 | Luenstroth | G06F 8/41 |
| 11,449,329 | B2 * | 9/2022 | Nakahara | G07C 5/0808 |
| 11,966,288 | B2 * | 4/2024 | Kim | G06F 11/27 |

(Continued)

FOREIGN PATENT DOCUMENTS

| | | |
|---|---|---|
| JP | 2007-082078 A | 3/2007 |
| JP | 2008-089493 A | 4/2008 |

(Continued)

OTHER PUBLICATIONS

Bogdan et al., "Delta Flashing of an ECU in the Automotive Industry", 2016, IEEE, pp. 503-507. (Year: 2016).*

*Primary Examiner* — Ted T. Vo
(74) *Attorney, Agent, or Firm* — Posz Law Group, PLC (57) ABSTRACT

The present disclosure discloses an electronic control device. The electronic control device includes a memory unit, a control executing unit, and a test executing unit. The memory unit includes a rewritable region, which stores a control program, and a non-rewritable region, which stores test data and an anticipated test result. The control executing unit acquires input data and calculates a control value by executing the control program using the input data. The test data corresponds to the input data. The test executing unit: executes the test by running the control program using the test data in response to rewriting of the control program; determines whether the control program after rewriting works normally by comparing a test result calculated based on the test data and the anticipated test result; and permits start of the control program according to the determining result.

6 Claims, 4 Drawing Sheets

(56) References Cited

U.S. PATENT DOCUMENTS

| | | | |
|---|---|---|---|
| 2005/0034034 A1* | 2/2005 | Kamada | G06F 21/79 714/52 |
| 2021/0255683 A1 | 8/2021 | Kozuka | |
| 2021/0309237 A1 | 10/2021 | Sekiguchi et al. | |
| 2023/0322243 A1 | 10/2023 | Sekiguchi et al. | |

FOREIGN PATENT DOCUMENTS

| | | |
|---|---|---|
| JP | 2008-112229 A | 5/2008 |
| JP | 2020064606 A | 4/2020 |
| JP | 2020140665 A | 9/2020 |
| JP | 2021-164009 A | 10/2021 |

\* cited by examiner

ELECTRONIC CONTROL DEVICE

CROSS REFERENCE TO RELATED APPLICATION

The present application claims the benefit of priority from Japanese Patent Application No. 2021-203611 filed on Dec. 15, 2021. The entire disclosure of the above application is incorporated herein by reference.

TECHNICAL FIELD

The present disclosure relates to an electronic control device.

BACKGROUND

Conventionally, a device with secure boot function is well-known as disclosed in JP 2021-131709 A, and the disclosure of JP 2021-131709 A is incorporated herein by reference.

SUMMARY

The present disclosure discloses an electronic control device. The electronic control device includes a memory unit, a control executing unit, and a test executing unit. The memory unit includes a rewritable region, which stores a control program, and a non-rewritable region, which stores test data and an anticipated test result. The control executing unit acquires input data and calculates a control value by executing the control program using the input data. The test data corresponds to the input data. The test executing unit: executes the test by running the control program using the test data in response to rewriting of the control program; determines whether the control program after rewriting works normally by comparing a test result calculated based on the test data and the anticipated test result; and permits start of the control program according to the determining result.

BRIEF DESCRIPTION OF DRAWINGS

Objects, features and advantages of the present disclosure will become apparent from the following detailed description made with reference to the accompanying drawings. In the drawings.

DETAILED DESCRIPTION

For example, the secure boot function may allow start of a control program which is authenticated after control value is incorrectly rewritten by mistake, or may allow start of a control program in which tampering is not detected. Therefore, there is a risk of starting a wrong control program. In view of the above aspect and other aspects not mentioned, an improvement is required to be made for the electronic control device.

According to an aspect of the present disclosure, an electronic control device includes a memory unit, a control executing unit, and a test executing unit. The memory unit includes a rewritable region and a non-rewritable region. The rewritable region is rewritable by an external device and stores a control program, and the non-rewritable region is not rewritable by the external device. The control executing unit acquires input data and calculates a control value by executing the control program using the input data. The test executing unit executes a test on the control program in response to a rewriting of the control program. The non-rewritable region stores test data and anticipated test result. The test data corresponds to the input data.

The test executing unit: executes the test by running the control program using the test data in response to the rewriting of the control program; determines whether the control program after rewriting works normally by comparing a test result calculated based on the test data and the anticipated test result stored in the non-rewritable region; and permits to start the control program after rewriting when the control program after rewriting is determined as working normally, and restricts to start the control program after rewriting when the control program after rewriting is determined as working abnormally.

The electronic control device in the present disclosure includes the test executing unit. The test executing unit uses test data stored in the non-rewritable region instead of input data when executing the test on the rewritten control program. The calculated result (test result) obtained by executing the control program is compared with the anticipated test result. Thus, the electronic control device can determine whether the control program is normal. With this configuration, start of the control program determined as abnormal, which is the wrong control program, can be restricted.

The following will describe embodiments of the present disclosure with reference to the drawings. For the elements assigned with the same reference symbols as corresponding components in the foregoing embodiments, description will be omitted for simplification purpose. When only a part of the configuration is described in one embodiment, the configurations of other embodiments previously described can be applied to the remaining portions of the configuration. In addition, while the various combinations and configurations, other combinations and configurations, including more, less or only a single element, are also within the spirit and scope of the present disclosure.

First Embodiment

The electronic control device may be applied to, for example, a moving object. The moving object may include a vehicle, a flying object, such as a drone, a ship, a construction machinery, an agriculture machinery, or the like. The electronic control device in the present embodiment controls a vehicle mounted equipment. The electronic control device is also referred to as an ECU. ECU is an abbreviation of electronic control unit. For example, the electronic control device includes an engine ECU, a hybrid vehicle electronic control unit (HVECU), an electric vehicle electronic control unit (EVECU), a battery ECU, a traveling control ECU, an air conditioning ECU, a autonomous driving ECU. A hardware configuration of the electronic control device will be described with reference to FIG. 1.

Hardware Configuration

Figure 1:
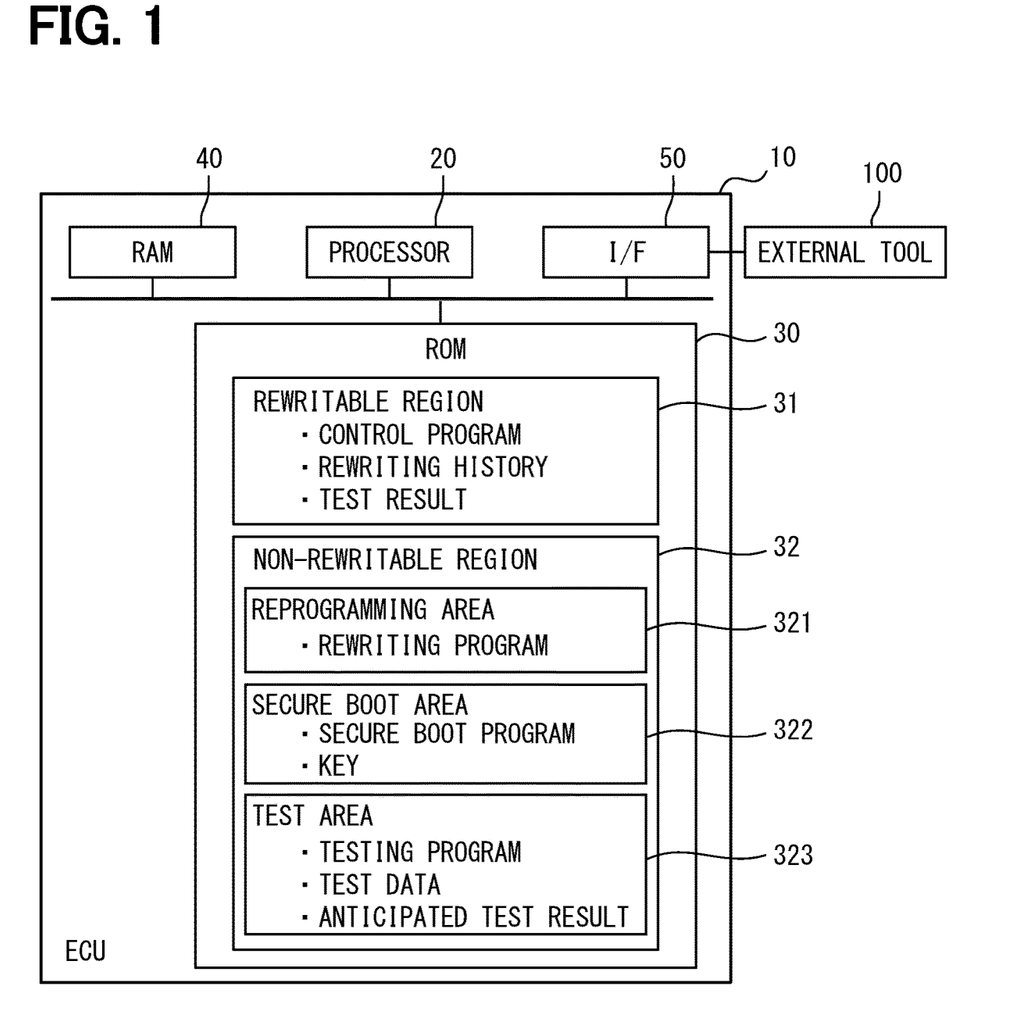
FIG. 1 is a diagram showing an electronic control device according to a first embodiment of the present disclosure.

As shown in FIG. 1, the electronic control device 10 includes a processor, a read only memory (ROM) 30, a random access memory (RAM) 40, and an interface 50. The processor is also known as a microcomputer. Except the components described above, the electronic control device 10 may further include an electric power circuit (not shown in the drawings).

The processor 20 corresponds to a hardware for calculating process. The processor corresponds to a central processing unit (CPU) or a core. The processor 20 performs a predetermined process by executing a program stored in the ROM 30 by using the RAM 40 as a temporary memory. The processor 20 includes multiple functional blocks as described below by executing multiple instructions included in the program.

The ROM 30 includes a rewritable non-volatile memory, and stores various programs and data. For example, the ROM 30 is provided by a flash memory. The ROM 30 includes a rewritable region 31, which is rewritable, and a non-rewritable region 32, which is not rewritable. The ROM 30 corresponds to a memory unit. The rewritable region 31 stores a control programs which is used for controlling the equipment. The rewritable region 31 also stores data, such as rewriting history and test result, which will be described later. The storing is also known as memory, recording, registration or the like.

The non-rewritable region 32 includes a reprogramming area 321, a secure boot area 322, and a test area 323. In the following description, the reprogramming area 321, the secure boot area 322, and the test area 323 will be simply referred to as area(s) 321, 322, 323. The reprogramming area 321 stores a rewriting program, which is necessary for a rewriting process (reprograming) of the control program. The reprograming is also referred to as reprog, repro, or the like. The secure boot area 322 stores a secure boot program and a key, which are used for executing a verification process. The verification process verifies a validity of the control program at an activation time of the electronic control device 10.

The test area 323 stores a testing program and data. The testing program is used for testing the rewritten control program. The data stored in the test area includes test data, anticipated test result, or the like. The non-rewritable region 32 is not limited to the configuration including three areas 321, 322, 323 as shown in this example. As another example, the secure boot area 322 and the test area 323 may be provided by a single area, or the three areas 321, 322, 323 may be provided by a single area, instead of separate areas.

The interface 50 includes an input output interface and a communication interface. For example, the electronic control device 10 acquires sensor signals from external via the interface 50. The electronic control device 10 outputs a control signal to the equipment via the interface 50. The electronic control device 10 of the present embodiment acquires a rewriting program for rewriting purpose from an external tool 100 via the interface 50. The external tool 100 is an electronic equipment used by a service provider to perform the program rewriting, and corresponds to an example of an external device. The rewriting program may be the entire control program or part of the control program.

The electronic control device 10 acquires the rewriting program by an over the air (OTA) technique. For example, the electronic control device 10 may receive the rewriting program from a vehicle-mounted communication device via a communication bus of an in-vehicle network and the interface 50. The vehicle-mounted communication device may receive the rewriting program by performing a wireless communication.

(Functional Configuration)

Figure 2:
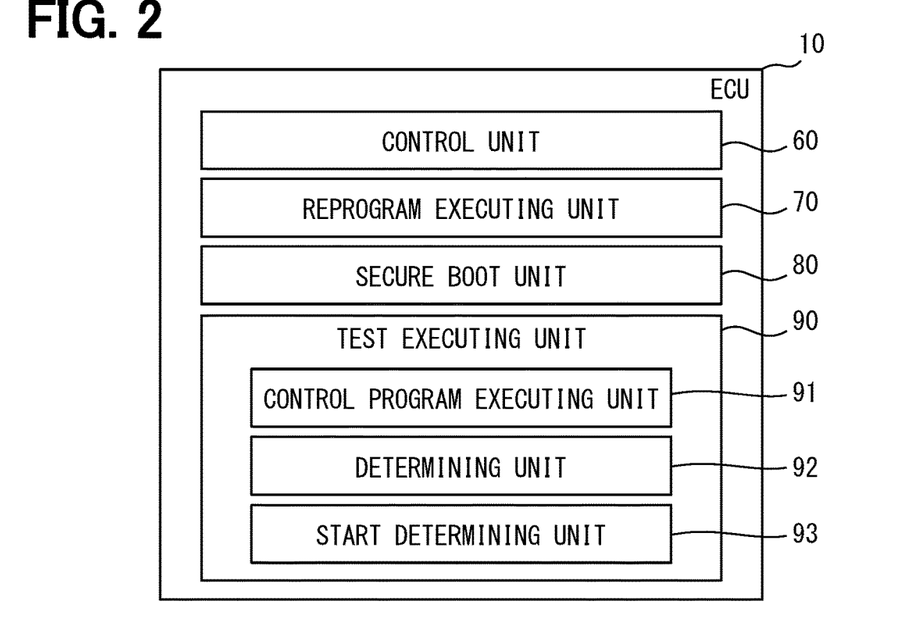
FIG. 2 is a block diagram showing functional blocks of the electronic control device.

The following will describe functional configuration of the electronic control device 10 with reference to FIG. 2.

As shown in FIG. 2, the electronic control device 10 includes multiple functional blocks, and these functional blocks are implemented by execution of a program by the processor 20. The program is stored in the ROM 30. As shown in FIG. 2, the electronic control device 10 includes a control unit 60, a reprogram executing unit 70, a secure boot unit 80, and a test executing unit 90.

The control unit 60 is implemented by execution of the control program stored in the rewritable region 31 by the processor 20. The control unit 60 performs a predetermined process using input data obtained via the interface 50, and calculates a control value for controlling the equipment. The control unit 60 corresponds to a control executing unit. For example, when controlling, as the equipment, a fuel injecting device, the input data includes signals detected by various sensors (not shown), such as a crank angle sensor, a cam shaft angle sensor, an accelerator position sensor, and an airflow meter. The control unit 60 executes the predetermined process using the signals detected by the various sensors, and outputs an injecting signal to each injector included in the injecting device.

The reprogram executing unit 70 is implemented by execution of the rewriting program stored in the non-rewritable region 32 by the processor 20. When the electronic control device 10 acquires the rewriting program via the interface 50, the reprogram executing unit 70 rewrites the control program to the rewriting program. In the present embodiment, the reprogram executing unit 70 erases the control program stored in the rewritable region 31, and then writes the rewriting program in the rewritable region 31. When the rewriting program is a part of the control program, the reprogram executing unit 70 erases only the corresponding part of the control program, and then rewrites the erased part of control program with the rewriting program. After executing the rewriting of control program, the reprogram executing unit 70 writes a rewriting history in the rewritable region 31.

The secure boot unit 80 is implemented by execution of the secure boot program stored in the non-rewritable region 32 by the processor 20. The secure boot unit 80 verifies a validity of the control program after a power of the electronic control device 10 is turned on and before the processor 20 executes (starts) the control program. The secure boot unit 80 may verify the validity of the control program by well-known methods.

For example, the secure boot unit 80 may generate a hash value from the control program data. The secure boot unit 80 may generate a hash value of valid program data by decrypting a digital signature with a key. The secure boot unit 80 determines the control program is valid when the two hash values are the same. When the two hash values are different, the secure boot unit 80 determines that the control program is not valid. The secure boot unit 80 allows start of the control program when the control program is determined to be valid, and restricts start of the control program when the control program is determined to be invalid. The secure boot unit 80 determines validity of the control program when the electronic control device 10 is turned on, regardless whether the control program is rewritten or not.

The test executing unit 90 is implemented by execution of the testing program stored in the non-rewritable region 32 by the processor 20. When the control program is rewritten, the test executing unit 90 executes a test on the rewritten control program. The test executing unit 90 includes a control program executing unit 91, a determining unit 92, and a start determining unit 93.

The control program executing unit 91 executes the control program using the test data stored in the non-rewritable region 32. By executing the control program using the test data, a test result corresponding to the test data as an input is calculated. The test result is also referred to as a control value. The test data corresponds to the above-described input data. The test data may be the input data itself for testing, or may be a related value of the input data, such as a required torque derived from the input data. The input data for testing purpose has a predetermined value within an appropriately possible range.

The determining unit 92 determines whether the test result is within a permitted range based on the test result calculated by the control program executing unit 91 and the anticipated test result stored in the non-rewritable region 32. Even if the control program is rewritten, the rewriting is limited within a range that enables a control to a control target (equipment) without control failure. Thus, the rewriting range can be anticipated. The anticipated test result is set as a possible value range which includes the execution result of control program before rewriting and a range including estimated rewriting contents. The permitted range may be set as the anticipated test result itself, or may be set as a value obtained by assigning a predetermined margin to the anticipated test result. The permitted range is also referred to as a threshold range.

The start determining unit 93 determines whether the rewritten control program is started based on the determination result of the determining unit 92. The start determining unit 93 allows start of the rewritten control program when the test result is within the permitted range. The start determining unit 93 restricts start of the rewritten control program when the test result is out of the permitted range.

The electronic control device 10 includes at least one processor 20 and at least one ROM 30 for implementing the above-described functional blocks. For implementing the above-described functional blocks, the electronic control device 10 may include multiple processors 20 and multiple ROMs 30. For example, the processor 20 and the ROM 30 for implementing the secure boot unit 80 may be separated from the processor 20 and the ROM 30 for implementing other functional blocks 60, 70, and 90.

Figure 3:
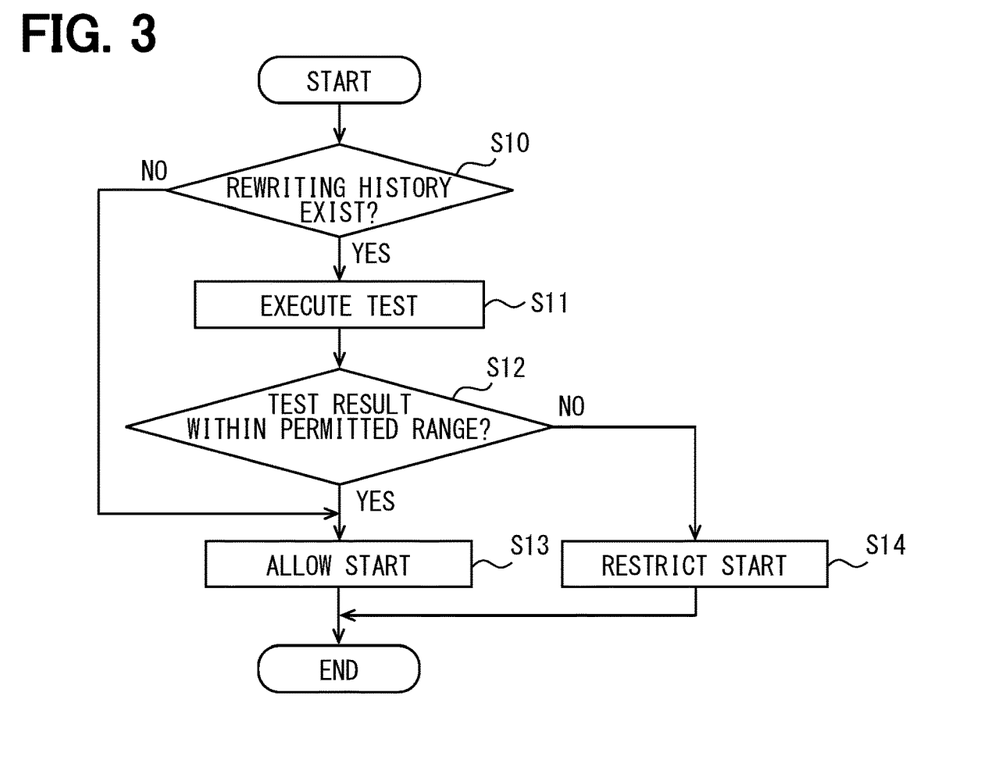
FIG. 3 is a flowchart showing a process executed by the electronic control device.

The following will describe a process executed at a start time of the electronic control device with reference to FIG. 3. Specifically, a process executed by the test executing unit 90 will be described.

After the electronic control device 10 is powered on, the secure boot unit 80 of the electronic control device 10 performs a verification process of the control program. After the verification process is ended, the test executing unit 90 of the electronic control device 10 executes the process shown in FIG. 3.

The test executing unit 90 determines whether the rewriting history is stored in the rewritable region 31 (S10). That is, the test executing unit 90 determines whether the rewriting process of the control program is executed or not.

When the rewriting history exists, the test executing unit 90 executes the test on the rewritten control program (S11).

The test executing unit 90 executes the test by executing the rewritten control program with the test data as an input value. After executing the test, the test result is obtained as an output value.

The test executing unit 90 determines whether the test result is within the permitted range (S12). That is, the test executing unit 90 determines whether the rewritten control program is normal or not. The test executing unit 90 executes a determination process using the test result obtained in S11 and the anticipated test result stored, in advance, in the non-rewritable region 32.

When the test result is within the permitted range, the test executing unit 90 allows the start of control program (S13), and ends the process. In S10, when the test executing unit 90 determines that there is no rewriting history, the process proceeds to S13 without executing S11 and S12, and allows the start of control program.

When the test result is out of the permitted range, the test executing unit 90 restricts the start of control program (S14), and ends the process. For example, the test executing unit 90 prohibits to start the control program.

When both of the secure boot unit 80 and the test executing unit permit the start of control program, the control unit executes the predetermined process. When the secure boot unit 80 permits the start of control program but the test executing unit 90 restricts the start of control program, the control unit 60 does not execute the predetermined process.

Processing order of the electronic control device 10 after power-on is not limited to the above-described example. As another example, the test executing unit may execute the test process before the secure boot unit 80 executes the verification process.

As described above, in the present embodiment, the electronic control device 10 includes the test executing unit 90 that executes the test on the control program when the control program is rewritten. The test executing unit 90 uses the test data stored in the non-rewritable region 32 instead of the input data when executing the test on the rewritten control program. Thus, it is possible to determine whether the rewritten control program works normally by comparing the test result and the anticipated test result. The test value is the control value calculated by executing the control program using the test data. With this configuration, it is possible to restrict start of the rewritten control program determined as working abnormally, which is the wrong control program. Thus, even when the secure boot unit 80 erroneously allow start of the control program which is authenticated after control value is incorrectly rewritten by mistake, or erroneously allow start of the control program in which tampering is not detected, the start of control program can be restricted by the test executing unit 90.

In the present embodiment, the test executing unit 90 determines whether the control program has been rewritten when the electronic control device 10 is powered on. When determining the rewriting of the control program, the test executing unit 90 executes the test to the control program. With this configuration, it is possible to restrict start of wrong control program by the processor 20 and restrict unexpected behavior of the control target equipment after the electronic control device 10 is powered on. For example, in a factory, it is possible to restrict an actuator from performing an unexpected operation when the electronic control device 10 is powered on after rewriting of the control program.

Second Embodiment

The second embodiment is a modification of the first embodiment, and description of the same configuration as first embodiment will be omitted. In the first embodiment, the test is executed when the electronic control device 10 is powered on. In the present embodiment, the test is executed when the rewriting of control program is completed.

Figure 4:
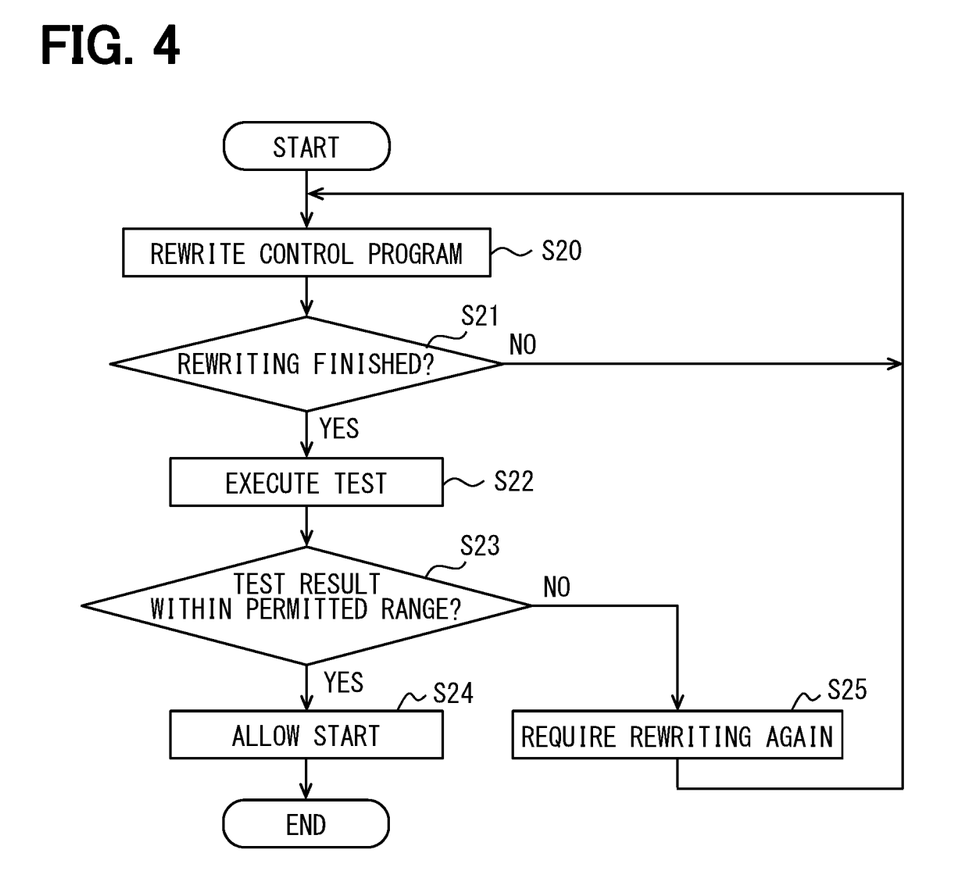
FIG. 4 is a flowchart showing a process executed by an electronic control device in a second embodiment of the present disclosure.

FIG. 4 is a flowchart showing a process executed by the electronic control device 10 in the present embodiment, specifically, the process executed by the test executing unit 90. When the electronic control device 10 acquires the rewriting program, the electronic control devices executes the following process.

First, the reprogram executing unit 70 of the electronic control device 10 rewrites the control program to the rewriting program (S20). The reprogram executing unit 70 in the present embodiment deletes the control program stored in the rewritable region 31, and then writes the rewriting program in the rewritable region 31.

Next, the test executing unit 90 determines whether the reprogram executing unit 70 has finished the rewriting of control program (S21). When rewriting is not finished, the process returns to S20.

After the reprogram executing unit 70 finishes the rewriting, the test executing unit 90 executes the test on the rewritten control program (S22), and then determines whether the test result is within the permitted range (S23). When the test result is within the permitted range, the test executing unit 90 allows start of the control program (S24), and ends the process. The process executed in S22, S23 and S24 are the same as the process executed in S11, S12 and S13 of the first embodiment.

When the test result is out of the permitted range, the test executing unit 90 requires rewriting of the control program again (S25). The test executing unit 90 requires a transmission source of the control program to transmit the rewriting program again. For example, when the external tool 100 receives a rewriting requirement from the test executing unit via the interface 50, the external tool 100 transmits the control program for rewriting purpose, that is, the rewriting program again to the electronic control device 10.

After transmitting the additional rewriting requirement, the electronic control device 10 returns to S20. When the electronic control device 10 acquires the rewriting program corresponding to the additional rewriting requirement, the process shown in FIG. 4 is repeated from S20.

As another example, after the electronic control device 10 executes S25, the process shown in FIG. 4 may be ended. When the rewriting program corresponding to the additional rewriting requirement is acquired, the electronic control device 10 may start the process shown in FIG. 4 again.

The electronic control device 10 according to the present embodiment can provide technical effects same as the electronic control device 10 according to the first embodiment. Thus, it is also possible to restrict start of the wrong control program after the control program is rewritten.

In the present embodiment, the test executing unit 90 executes the test on the control program when rewriting of the control program is finished. That is, the test is executed immediately after the rewriting of control program. Thus, it is possible to restrict the processor 20 to execute the wrong control program.

In the present embodiment, when the test executing unit 90 determines that the test result is out of the permitted range, that is, the control program is abnormal, the test executing unit requires rewriting of the control program again. With this configuration, it is possible to obtain a correct rewriting program.

Third Embodiment

The third embodiment is a modification of the preceding embodiments, and description of the same configuration as preceding embodiments will be omitted. In the preceding embodiments, the rewriting of control program is required when the test result is out of the permitted range. As another example, in the present embodiment, the control program is reset to the control program before rewriting.

Figure 5:
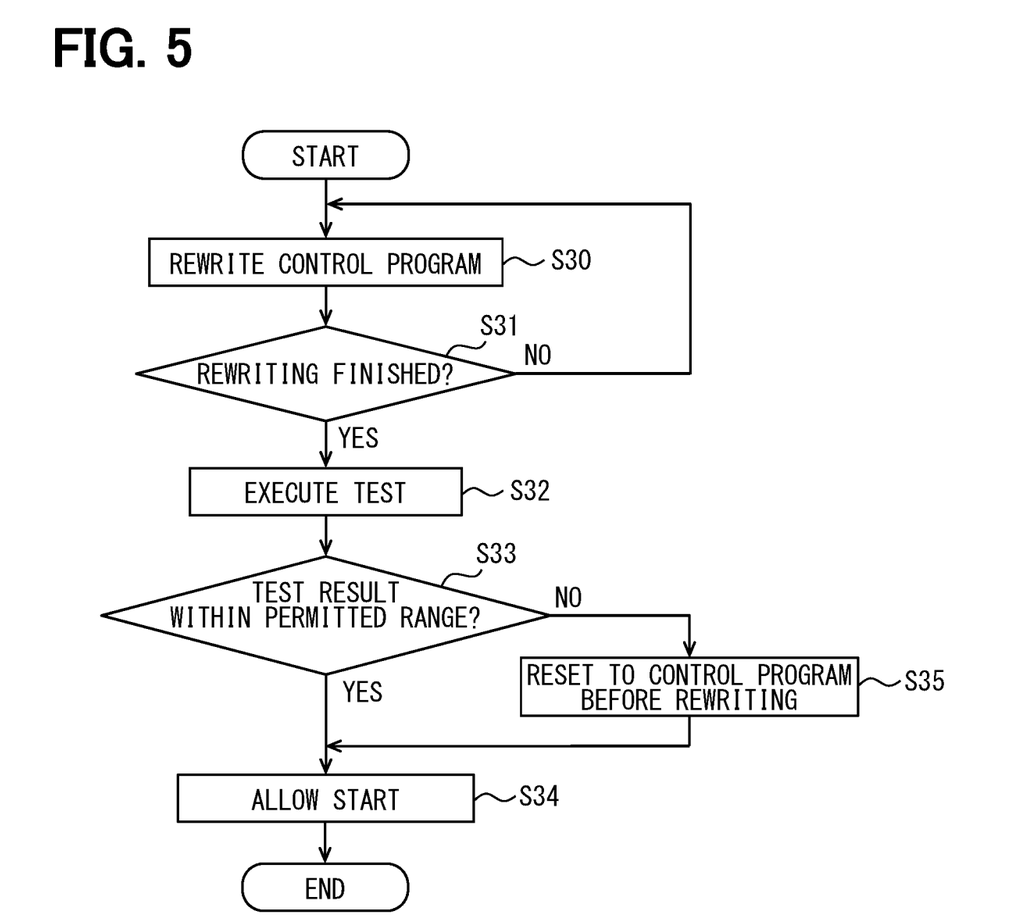
FIG. 5 is a flowchart showing a process executed by an electronic control device in a third embodiment of the present disclosure.

FIG. 5 is a flowchart showing a process executed by the electronic control device 10 of the present embodiment, specifically, the process executed by the test executing unit 90. When the electronic control device 10 acquires the rewriting program, the process shown in FIG. 5 is executed.

The process executed in S30, S31, S32, S33, and S34 as shown in FIG. 5 are the same as the process executed in S20, S21, S22, S23, and S24 in the previous embodiment shown in FIG. 4. In the present embodiment, the rewritable region 31 maintains the control program before rewriting until test executed by the test executing unit 90 finishes. For example, when rewriting is being executed in S30, the reprogram executing unit 70 may maintain the control program before rewriting in a backup area. As another example, the reprogram executing unit 70 may write the rewriting program in an area different from an area where the control program is stored. That is, two storing areas may be prepared for alternately storing the control program before rewriting and the control program for rewriting purpose.

When the test result is determined to be out of the permitted range in S33, the test executing unit 90 resets the control program before rewriting (S35). For example, the test executing unit 90 may write the maintained control program before rewriting in the backup area as a new control program. The test executing unit 90 may switch the control program by switching the two storing areas. That is, the test executing unit 90 may switch the storing area in which the control program before rewriting is stored as a target storing area to be used by the control unit 60.

After performing S35, the test executing unit 90 proceeds to S34. In S34, the test executing unit 90 allows the start of control program, and then ends the process.

When the test executing unit 90 executes S35, the test executing unit 90 may notify, at the same time, the transmission source that the control program before rewriting is reset. As another example, after the test executing unit 90 executes S35, the test executing unit 90 may notify the transmission source that the control program before rewriting is reset without proceeding to S34, and may end the process shown in FIG. 5.

In the above-described configuration, the test executing unit 90 resets the new control program to the control program before rewriting. The present disclosure is not limited to this configuration. For example, the test executing unit 90 may output a reset command to the reprogram executing unit 70. In this configuration, the reprogram executing unit 70 may reset the control program maintained in the backup area before rewriting as the new control program.

The electronic control device 10 according to the present embodiment can provide technical effects same as the electronic control device 10 according to the preceding embodiments. The electronic control device according to the present embodiment can restrict start of the wrong control program after the control program is rewritten. The test executing unit 90 executes the test immediately after the control program is rewritten. Thus, it is possible to restrict the processor 20 from executing the wrong control program.

In the present embodiment, the test executing unit 90 determines the control program works abnormally when the test result is out of the permitted range, and resets the control program before rewriting as the new control program. As a result, it is able to suppress occurrence of a period during which the control target equipment is out of control.

Other Embodiments

The disclosure in the present disclosure and drawings is not limited to the exemplified embodiments. The present disclosure includes embodiments described above and modifications of the above-described embodiments made by a person skilled in the art. For example, the present disclosure is not limited to a combination of the components and/or elements described in the embodiments. The disclosure may be implemented in various combinations. The present disclosure may include additional configuration that can be added to the above-described embodiments. The present disclosure also includes modifications which include partial components/elements of the above-described embodiments. The present disclosure includes replacements of components and/or elements between one embodiment and another embodiment, or combinations of components and/or elements between one embodiment and another embodiment The technical scope disclosed in the present disclosure is not limited to the above-described embodiments. It should be understood that a part of disclosed technical scopes are indicated by claims, and the present disclosure further includes modifications within an equivalent scope of the claims.

The disclosure in the specification, the drawings and the like are not limited by the description of the claims. The disclosures in the specification, the drawings, and the like include the technical ideas described in the claims, and further extend to a wider variety of technical ideas than those described in the claims. Thus, various technical ideas can be extracted from the disclosure of the specification, the drawings and the like without being limited to the description of the present disclosure.

In the foregoing embodiments, start of the rewritten control program is prohibited when the test result is out of the permitted range as an example. The test is executed when the electronic control device 10 is powered on. Alternatively, when the test is executed after rewriting of the control program is finished and the test result is out of the permitted range, start of the rewritten control program may be prohibited.

In the foregoing embodiments, when the test is executed after rewriting of the control program is finished and the test result is out of the permitted range, additional rewriting of the control program is required as an example. Alternatively, the additional rewriting of the control program may be required when the test is executed after the electronic control device 10 is powered on and the test result is out of the permitted range. In the foregoing embodiments, when the test is executed after rewriting of the control program is finished and the test result is out of the permitted range, the control program is reset to the control program before rewriting as an example. Alternatively, the control program may be reset to the control program before rewriting when the test is executed after the electronic control device 10 is powered on and the test result is out of the permitted range.

What is claimed is:

1. An electronic control device comprising:
a memory unit including a rewritable region and a non-rewritable region, the rewritable region being rewritable by an external device and storing a control program, the non-rewritable region being not rewritable by the external device;
a control executing unit acquiring input data and calculating a control value by executing the control program using the input data; and
a test executing unit executing a test on the control program in response to a rewriting of the control program,
wherein
the non-rewritable region stores test data and anticipated test result, the test data corresponds to the input data, and
the test executing unit:
executes the test by running the control program using the test data in response to the rewriting of the control program;
determines whether the control program after rewriting works normally by comparing a test result calculated based on the test data and the anticipated test result stored in the non-rewritable region; and
permits to start the control program after rewriting when the control program after rewriting is determined as working normally, and restricts to start the control program after rewriting when the control program after rewriting is determined as working abnormally.

2. The electronic control device according to claim 1, wherein
the test executing unit executes the test on the control program after the rewriting of the control program is finished.

3. The electronic control device according to claim 2, wherein
the test executing unit resets the control program to a state before the control program is rewritten when the control program after rewriting is determined as working abnormally.

4. The electronic control device according to claim 2, wherein
the test executing unit requires the rewriting of the control program again when the control program after rewriting is determined as working abnormally.

5. The electronic control device according to claim 1, wherein
the test executing unit
determines whether the rewriting of the control program is executed at a start time of the electronic control device, and
executes the test on the control program when the rewriting of the control program is determined to be executed.

6. An electronic control device comprising:
a computer-readable non-transitory storage medium including a rewritable region and a non-rewritable region, the rewritable region being rewritable by an external device and storing a control program, the non-rewritable region being not rewritable by the external device; and
a microcomputer configured to:
acquire input data and calculate a control value by executing the control program using the input data, wherein the non-rewritable region stores test data and anticipated test result, and the test data is provided by the input data;
execute a test on the control program by running the control program using the test data in response to a rewriting of the control program;
determine whether the control program after rewriting works normally by comparing a test result calculated based on the test data and the anticipated test result stored in the non-rewritable region; and permit to start the control program after rewriting when the control program after rewriting is determined as working normally, and restrict to start the control program after rewriting when the control program after rewriting is determined as working abnormally.

\* \* \* \* \*